Jan. 16, 1962 E. SUSSMAN 3,016,724
ADJUSTABLE TORQUE SENSITIVE COUPLINGS
Filed Feb. 20, 1961 2 Sheets-Sheet 1
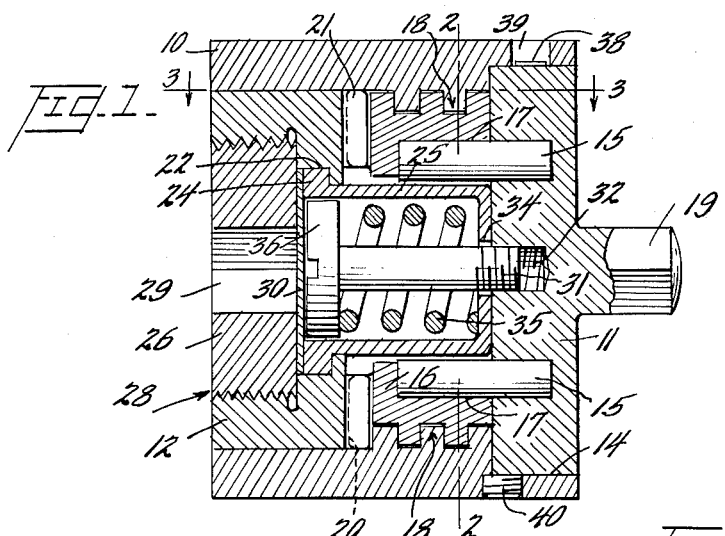
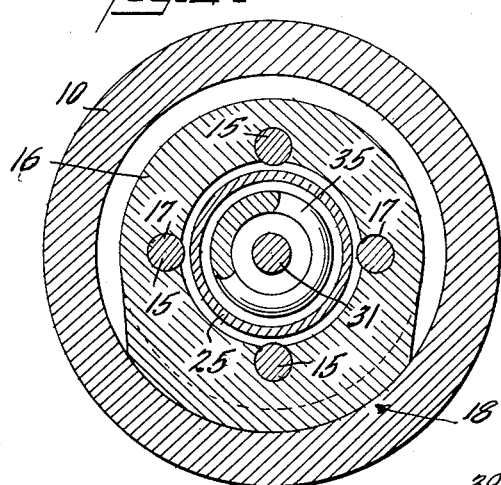
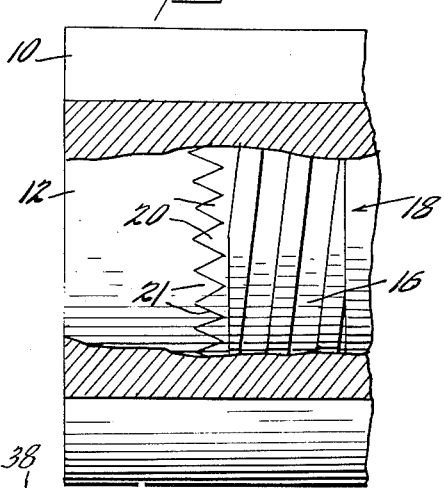
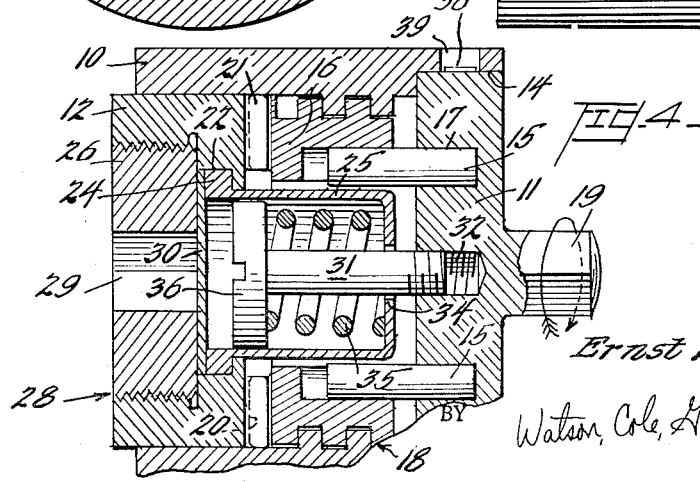
INVENTOR
Ernst Sussman,
BY Watson, Cole, Grindle & Watson
ATTORNEYS

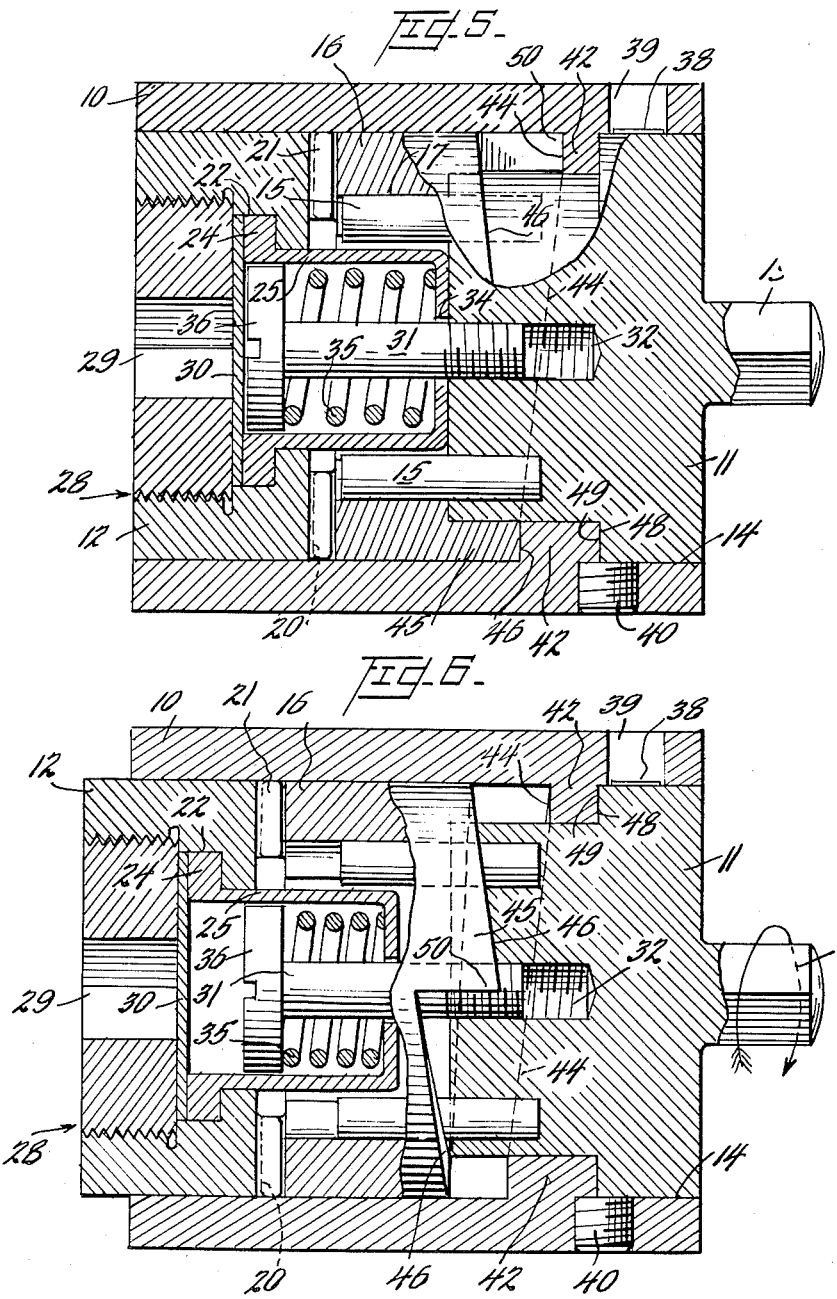

ated Jan. 16, 1962

3,016,724
ADJUSTABLE TORQUE SENSITIVE COUPLINGS
Ernst Sussman, Biery's Bridge Road, Bethlehem, Pa.
Filed Feb. 20, 1961, Ser. No. 90,468
13 Claims. (Cl. 64—29)

This invention relates to torque sensitive couplings and more particularly to torque sensitive couplings wherein adjustment can be made to preset the torque at which the overload releases are rendered effective.

It is a primary object of this invention to provide new and improved torque sensitive couplings.

It is another object of this invention to provide torque sensitive couplings in which adjustment is provided for varying the torque calibrations thereof.

It is another object of this invention to provide torque sensitive couplings which are simple to construct and and operate and which occupy a minimum of space.

It is a further object of this invention to provide torque sensitive couplings which may be driven in either direction.

It is yet another object of this invention to provide torque sensitive couplings wherein the torque calibrations will be the same for either direction of rotation.

It is a still further object of this invention to provide torque sensitive couplings wherein there is no tendency of the driven element to slip in a reverse direction to that of the desired rotation.

It is yet another object of this invention to provide torque sensitive couplings wherein the members which slip upon overload are of such configuration that a chattering sound will be produced to signify that slip is occurring.

It is still another object of this invention to provide torque sensitive couplings having means for initially adjusting the compression member to provide for calibration of the couplings.

It is yet a further object of this invention to provide torque sensitive couplings having means for preventing tampering with the zero adjustments.

With these and other objects in view, the present invention contemplates a torque sensitive coupling including an outer sleeve surrounding a driving element and a driven element. The driving element mounts an intermediate element threadedly connected to the sleeve and capable of axial movement relative to the driving element along pins secured to the driving element. The intermediate element is provided with teeth which mate with corresponding teeth on the driven element to provide the clutch which slips upon overload. The driven element carries a cup member extending toward the driving member. The driving element mounts a threaded member which extends into the cup member through a central aperture therein. A compression spring is interposed between an enlarged head on the threaded member and the bottom of the cup to normally urge the driving and driven elements together which in turn causes firm engagement between the teeth on the intermediate and driven elements. By rotating the sleeve relative to the driving and intermediate elements, the intermediate element may be moved axially with respect to the driving element. Since this movement of the intermediate element also moves the driven element, the bottom of the cup will move toward the head of the threaded member and the spring will be further compressed with a consequent increase in the amount of torque which can be transmitted before the teeth will slip under load. A scale calibrated in torque units is marked on the periphery of the driving element and may be read through an opening in the sleeve. A set screw is provided for locking the sleeve in any of a plurality of positions to permit presetting various torque values at which the teeth will slip. The coupling may be initially calibrated by moving the threaded member as required so that the torque at whch the teeth slip for minimum setting of the sleeve and intermediate element corresponds to the reading on the scale in this position.

In an alternative embodiment of the invention, the threaded connection between the sleeve and intermediate element is replaced by a cam arrangement connecting the sleeve and the driving element. The interior of the sleeve is provided with a cam which projects radially inwardly and is received in an undercut portion of the driving element. The inner radial surface of the cam defines a helical path and is in sliding contact with a corresponding surface on an extension of the intermediate member which surrounds the reduced portion of the driving element. Upon rotation of the sleeve, the cam surfaces cause a separation of the driving and intermediate elements with a consequent compression of the spring to increase the torque value at which the teeth will slip.

Other objects, advantages, and novel features of the invention will become readily apparent upon consideration of the following detailed description when taken in conjunction with the accompanying drawings wherein:

FIGURE 1 is a longitudinal section through a preferred embodiment of the present invention and illustrates the salient features thereof;

FIGURE 2 is a sectional view taken along the line 2—2 of FIGURE 1 and illustrates the pin connection between the driving and intermediate elements of the coupling;

FIGURE 3 is a fragmentary sectional view taken along the line 3—3 of FIGURE 1 and shows the toothed connections between the intermediate and driven elements;

FIGURE 4 is a view similar to FIGURE 1 and discloses the relationship of the various parts after adjustment to permit transmission of a torque greater than minimum torque;

FIGURE 5 is a view similar to FIGURE 1 of an alternative embodiment of the present invention; and FIGURE 6 is a view similar to FIGURE 4 of the alternative embodiment.

Attention now is directed to the drawings wherein like numerals of reference designate like parts throughout the several views and in particular to FIGURE 1 wherein is disclosed a preferred embodiment of the present invention. The coupling comprises an outer sleeve 10, within which are a driving element 11 and a driven element 12. The driving element is positioned for rotation in a counterbored recess 14 formed in the sleeve 10.

The driving element 11 is provided with a plurality of pins 15 which project axially therefrom and have a press fit in appropriate axial recesses in the driving element. An intermediate element 16 is mounted for axial movement along the pins 15 by means of sockets 17 (FIGURE 2) which slidably receive the pins. The intermediate element 16 is threadably connected at 18, by means of square threads, to the sleeve 10. The driving element 11 is further provided with an exterior projection 19, of polygonal cross-section, for connecting the coupling to any of various types of driving means (not shown), either manually or power operated.

The intermediate element 16 is provided with an annular ring of V-shaped teeth 20 (FIGURE 3). These teeth 20 are normally in mesh with an annular ring of similar teeth 21 formed on the interior extremity of the driven element 12.

The driven element 12 is provided with a counterbored recess 22 which receives a flange 24 of a cup-shaped spring retainer 25. A socket member 26 is threadably conected at 28 to the driven element 12. The member 26 is provided with a socket 29, of polygonal cross-section, which is adapted to drivingly receive a mating projecting of a socket wrench or other tool (not shown) which is to be driven. A cover disc 30 is interposed between the member 26 and the flange 24. The disc 30 serves as a dust seal and also serves to preclude tampering with the zero adjustment which will be described later.

An adjusting screw 31 is positioned in a threaded recess 32 in the driving element 11. The screw 31 is accommodated within the spring retainer cup 25 by means of an aperture 34 formed in the bottom of the retainer. A helical compression spring 35 is positioned within the retainer 25 and is interposed between the bottom of the retainer and an enlarged head 36 formed on the screw 31. The spring 35 normally urges the screw 31 and spring retainer 25 apart which, as is obvious from FIGURE 1 of the drawings, serves to maintain the sets of teeth 20 and 21 in driving contact.

The driving element 11 is provided with a series of indicia 38 arranged about the periphery thereof (FIGURE 3) which represent the calibration of the adjustable coupling. The indicia may be in inch-pounds, or any other convenient unit. An aperture 39 is provided in the sleeve 10 for viewing the indicia 38. A set screw 40 is provided in the sleeve 10 for locking the sleeve relative to the driving element 11 with the desired setting visible in the aperture 39.

Having described the various elements comprising the torque sensitive coupling comprising one embodiment of the present invention, its mode of operation will now be explained in order that a better understanding of the invention may be had.

During initial assembly of the coupling, the various parts are conjoined as illustrated in FIGURE 1 with the exception of the socket member 26 and the disc 30. With the intermediate element 16 threaded into the sleeve 10 as far as it will go, the coupling is in its minimum torque position and the lowest calibration of the indicia 38 will be visible in the aperture 39. Torque is then transmitted through the coupling from the driving element 11 to the driven element 12 by any suitable means and this torque is increased until the teeth 20 and 21 begin to slip by sliding over one another. The torque value at which slip occurs is then compared to that indicated by the indicia 38 in the aperture 39. If this torque value is the same as that indicated, then assembly can be completed. Otherwise, the screw 31 is turned in or out as appropriate to vary the force exerted by the spring 35 which holds the teeth 20 and 21 together in torque transmitting relationship. The torque which may be transmitted is, of course, a function of the force holding the driven element 12 and the intermediate element 16 together. The greater this force, the greater the torque which may be applied to the coupling before the spring 31 is compressed sufficiently to permit the teeth to slide over one another to successive mating positions. When the screw 31, and hence the compression of the spring 35, has been adjusted so that the coupling slips at the minimum indicated torque, assembly may then be completed by insertion of the disc 30 and then the threaded socket member 26.

To set the coupling for release at some torque value other then the minimum value, the driving element 11, and hence the intermediate element 16, are turned in the direction indicated by the arrow in FIGURE 4 while the sleeve 10 is held stationary. This moves the intermediate element 16 to the left relative to the sleeve 10 due to the threads 18. During rotation of the driving element 11, the driven element 12 and the various intermediate parts all rotate due to the driving connection established between the teeth 20 and 21. However, axial movement of the driving element 11 to the left is precluded by the bottom portion of the counterbored recess 14. Consequently, the driving element 11 and the intermediate element 16 separate axially although a driving connection therebetween is maintained by the pins 15. The rotation of driving element 11 is stopped when the indicia representing the desired maximum torque appears in the aperture 39. The various parts will then be in the positions shown in FIGURE 4. At this time the set screw 40 is tightened to preclude movement of the elements 11 and 16 relative to the sleeve 10 which would result in a change in the setting.

Since the driving element 11 is precluded from axial movement to the left as the intermediate element 16 moves, the screw 31 likewise remains in the same axial position. The retainer cup 25, being carried by the moving driven element 12, will therefore further compress the spring 35 as it moves toward the head 36 of the screw 31. Increased compression of the spring 35 increases the force applied to the driving element 12 and the intermediate element 16 and thus holds the teeth 20 and 21 more firmly together. The coupling will then transmit a greater torque before slipping than when the spring 35 is subjected to a smaller compressive load.

In operation, the teeth will be maintained in full engagement by the spring 35 as long as the preset torque is not approached. For example, if a socket wrench were attached to the driven element 12 and the driving element 11 rotated by a suitable tool, the nut engaged by the socket wrench would be rotated by the coupling without any separation occurring between the teeth 20 and 21. However, as the nut tightens near the end of its travel, an increasing reactive force will be applied to the teeth 21 tending to oppose the torque applied by the coupling. As the torque being applied approaches the preset minimum, the teeth 20 and 21 begin to slide apart along their mating surfaces further compressing the spring 35. When the preset maximum torque is reached, the tips of the teeth 21 will clear the tips of the teeth 20 and will then drop into the next set of spaces between the teeth 20. Continued application of torque to the tool which turns the driving element 11 will only result in repeated skipping of the teeth 21 along the teeth 20 with the sliding action being repeated at each successive position. Thus the coupling will preclude the application of torque in excess of the preselected and preset magnitude despite further rotation of the driving element 11.

Since the alternative embodiment illustrated in FIGURES 5 and 6, differs from the preferred embodiment only in the means provided for adjusting the coupling to preset the maximum torque which can be transferred, like parts will be similarly designated and only the adjusting means will be described. In this embodiment, the sleeve 10 is provided with a cam 42 (FIGURE 5) which projects radially inwardly and has a helically disposed cam surface 44 thereon. The intermediate element 16 is provided with an annular extension 45 which surrounds an inner extremity of reduced diameter of the driving element 11. The extension 45 has a helically disposed cam surface 46 thereon which is complementary to and in sliding contact with the cam surface 44 on the cam 42. The cam 42 also has a bearing surface 48 disposed perpendicular to the axis of the sleeve which is in sliding contact with a matching bearing surface 49 provided by the undercut portion of the driving element 11.

The above-described arrangement replaces the threaded connection 18 illustrated in the preferred embodiment, so that the intermediate element 16 now has a smooth periphery slidable within the sleeve 10 and is connected to the sleeve solely by the cam 42. It is, of course, obvious that with minor modifications the threaded connection of the preferred embodiment or the cam connection of the alternative embodiment could be arranged between the sleeve and the driving element rather than the sleeve and the intermediate element. It is only necessary that either arrangement be such as to effect separation of the driving and intermediate elements upon relative rotation between these elements and the sleeve.

In operation, to preset the maximum torque which may be transmitted by the coupling, the driving element 11 is rotated in the direction shown by the arrow in FIGURE 6 while the sleeve 10 is held stationary. As the intermediate element 16 rotates with the driving element 11, the cam surface 46 rides up the cam surface 44 to move the element 16 axially (to the left in FIGURE 6). As illustrated in FIGURE 6, the element 16 has been rotated through three quarters of a turn. In this position, the surface 46 is in engagement with the surface 44 only between a high point 50 on the extension 45 and a point lying in the plane of the drawing at the top of FIGURE 6. The portion of the cam 42 which corresponds to this portion of the extension 45 does not show in FIGURE 6 due to the fact that it lies in the section which is cut away. Since engagement of bearing surfaces 48 and 49 precludes similar movement of the driving element 11, the elements 11 and 16 will separate as shown. This movement serves to further compress the spring 35 in a manner similar to the operation of the preferred embodiment. The driving and intermediate elements may then be locked relative to the sleeve 10 by the set screw 40 as before. The alternative embodiment will then function in the manner previously described for the preferred embodiment.

It will be understood from the above disclosures, that the present invention provides new and improved torque sensitive couplings which are both simple to construct and operate and which occupy a minimum of space. The couplings of the present invention are readily adjustable to provide a range of preset torques available between a minimum and a maximum value. By varying spring sizes and the sizes of other parts, different torque ranges may be provided to accommodate different applications. The utilization of hardened and pointed teeth provides an audible signal when the overload torque is reached. A dust cover has been provided which also serves to discourage tampering with the zero adjustment.

It is to be understood that the above described embodiments are simply illustrative of the salient features of the present invention. Numerous modifications may be readily devised by those skilled in the art to obtain similar devices which will still embody the principles of the present invention and fall within the spirit and scope thereof.

What is claimed is:

1. An adjustable torque sensitive coupling comprising a sleeve, a driving element positioned within said sleeve, a driven element positioned within said sleeve for axial and rotary movement with respect thereto, an intermediate element carried by said driving element for axial movement relative thereto, said intermediate and driven elements being provided with matching teeth which provide a driving connection between said elements when in mesh, a first retainer secured to said driving element, a second retainer secured to said driven element, a resilient member coupled to said retainers and normally urging said driving and driven elements into contact with said intermediate element, and means connecting said sleeve and said intermediate element whereby relative rotation advances said intermediate element axially of said sleeve, said connecting means including means for effecting separation of said driving and intermediate elements when said intermediate element moves in one axial direction to further stress said resilient member and thereby increase the force holding said teeth in driving contact.

2. A coupling as defined in claim 1 wherein said intermediate element is carried by a plurality of pins secured to said driving element and slidable in slots formed in said intermediate element.

3. A coupling as defined in claim 1 wherein said teeth are hardened and are of V-shaped configuration.

4. A coupling as defined in claim 1 wherein said teeth are formed on annular axial projections on said driven and intermediate elements.

5. A coupling as defined in claim 1 wherein said retainers are provided with transversely disposed portions and said resilient member is a compression spring interposed between said transverse portions.

6. A coupling as defined in claim 1 wherein means are provided for locking said sleeve and said driving element against relative rotary movement.

7. A coupling as defined in claim 1 wherein an aperture is provided in said sleeve for viewing indicia on said driving element indicating the relative positions of said driving element and said sleeve.

8. A coupling as defined in claim 1 wherein said connecting means comprises mating threads formed on said sleeve and said intermediate element.

9. A coupling as defined in claim 8 wherein said separation effecting means comprises an enlarged portion on said driving element positioned within a counterbored recess in said sleeve.

10. A coupling as defined in claim 1 wherein said connecting means comprises a cam formed integral with said sleeve and projecting radially inward into engagement with said intermediate element in a space defined by an undercut portion on said driving element.

11. A coupling as defined in claim 10 wherein said separation effecting means comprises an enlarged portion on said driving element positioned within a counterbored recess in said sleeve.

12. An adjustable torque sensitive coupling comprising an outer cylindrical sleeve, a cylindrical driving element positioned in one end of said sleeve, a cylindrical driven element positioned in the opposite end of said sleeve for axial and rotary movement with respect thereto, a cylindrical intermediate element interposed between said driving and driven elements, a plurality of pins secured to said driving element and slidable within slots formed in said intermediate element to preclude relative rotary movement between said driving and intermediate elements, said driven and intermediate elements being provided with V-shaped teeth formed on facing, annular, axial projections thereof, said teeth when in mesh providing a driving connection between said driven and intermediate elements, a cup-shaped spring retainer carried by said driven element and projecting toward said driving element, a spring retaining screw having an enlarged head secured to said driving element, the head of said screw being disposed within said cup-shaped retainer and the body thereof passing through a hole formed in the bottom of said cup-shaped retainer, a compression spring interposed between said enlarged head and the bottom of said cup-shaped retainer and normally urging said driving and driven elements into contact with said intermediate element whereby said teeth are maintained in contact and outward axial movement of said driven element is restrained, a threaded connection between said sleeve and said intermediate element whereby relative rotation advances said intermediate element axially of said sleeve, means integral with said sleeve and abutting said driving element for effecting separation of said driving and intermediate elements when said intermediate element moves in one axial direction to further compress said spring and thereby increase the force holding said teeth in driving contact, and a set screw threaded in the side of said sleeve for engaging said intermediate member to lock said sleeve and driving element against relative rotation, said sleeve being provided with an aperture for viewing indicia on said driving member indicating the relative positions in which said driving element and said sleeve are locked by said set screw.

13. An adjustable torque sensitive coupling comprising an outer cylindrical sleeve, a cylindrical driving element positioned in one end of said sleeve, a cylindrcal driven element positioned in the opposite end of said sleeve for axial and rotary movement with respect thereto, a cylindrical intermediate element interposed between said driving and driven elements, a plurality of pins secured to said driving element and slidable within slots formed in said intermediate element to preclude relative rotary movement between said driving and intermediate elements, said driven and intermediate elements being provided with V-shaped teeth formed on facing, annular, axial projections thereof, said teeth when in mesh providing a driving connection between said driven and intermediate elements, a cup-shaped spring retainer carried by said driven element and projecting toward said driving element, a spring retaining screw having an enlarged head secured to said driving element, the head of said screw being disposed within said cup-shaped retainer and the body thereof passing through a hole formed in the bottom of said cup-shaped retainer, a compression spring interposed between said enlarged head and the bottom of said cup-shaped retainer and normally urging said driving and driven elements into contact with said intermediate element whereby said teeth are maintained in contact and outward axial movement of said driven element is restrained, a cam formed integral with said sleeve and projecting radially inward into a space defined by an undercut portion of said driving element, said cam being provided with a radially extending, helically disposed cam surface, an annular projection on said intermediate member having radially extending, helically disposed surface complementary to and in engagement with said cam surface whereby rotation of said sleeve in one direction relative to said intermediate element effects a separation of said driving and intermediate elements to further compress said spring and thereby increase the force holding said teeth in driving contact, and a set screw threaded in the side of said sleeve for engaging said intermediate member to lock said sleeve and driving element against relative rotation, said sleeve being provided with an aperture for viewing indicia on said driving member indicating the relative positions in which said driving element and said sleeve are locked by said set screw.

References Cited in the file of this patent
UNITED STATES PATENTS

| | | |
|---|---|---|
| 1,126,219 | Hupp | Jan. 26, 1915 |
| 1,198,421 | Conklin | Sept. 19, 1916 |
| 1,237,932 | Marlin | Aug. 21, 1917 |
| 1,828,370 | Huddle | Oct. 20, 1931 |
| 2,333,553 | Potgieter et al. | Nov. 2 1943 |